United States Patent
Schiener et al.

(10) Patent No.: US 7,357,454 B2
(45) Date of Patent: Apr. 15, 2008

(54) REGULATING DEVICE FOR A LATERAL PART OF A SEAT

(75) Inventors: Sven Schiener, Schwanstetten (DE); Veit Stössel, Nürnberg (DE)

(73) Assignee: Schukra Geratebau AG, Berndorf (AT)

( * ) Notice: Subject to any disclaimer, the term of this patent is extended or adjusted under 35 U.S.C. 154(b) by 0 days.

(21) Appl. No.: 10/590,470

(22) PCT Filed: Mar. 16, 2005

(86) PCT No.: PCT/EP2005/002808

§ 371 (c)(1),
(2), (4) Date: Apr. 30, 2007

(87) PCT Pub. No.: WO2005/090119

PCT Pub. Date: Sep. 29, 2005

(65) Prior Publication Data

US 2007/0222264 A1    Sep. 27, 2007

(30) Foreign Application Priority Data

Mar. 16, 2004    (DE) .................. 10 2004 012 829

(51) Int. Cl.
 *B60N 2/44* (2006.01)
(52) U.S. Cl. .................................. 297/284.9
(58) Field of Classification Search ............ 297/284.2, 297/284.4, 284.9, 284.11
See application file for complete search history.

(56) References Cited

U.S. PATENT DOCUMENTS

| | | | |
|---|---|---|---|
| 3,608,960 A | * | 9/1971 | Sherman ................. 297/284.9 |
| 4,370,000 A | * | 1/1983 | Kazaoka et al. ......... 297/284.9 |
| 4,455,047 A | * | 6/1984 | Watanabe ................. 297/284.9 |
| 4,636,000 A | * | 1/1987 | Nishino ................... 297/284.9 |
| 4,938,529 A | | 7/1990 | Fourrey |
| 5,149,172 A | * | 9/1992 | Davis ..................... 297/256.11 |
| 6,793,289 B2 | | 9/2004 | Kuster et al. |

FOREIGN PATENT DOCUMENTS

| | | |
|---|---|---|
| DE | 197 37 271 C1 | 5/1999 |
| DE | 199 50 702 A1 | 4/2001 |
| EP | 0 670 240 A1 | 9/1995 |
| FR | 2 691 114 | 11/1993 |
| GB | 1 367628 | 9/1974 |
| WO | WO 92/09451 | 6/1992 |

OTHER PUBLICATIONS

International Search Report for PCT/EP2005/002808.

* cited by examiner

*Primary Examiner*—Peter R. Brown
(74) *Attorney, Agent, or Firm*—Grant D. Kang

(57) ABSTRACT

An adjustment device is provided for adjusting the height of a side cheek (1) of a seat, whereby the side cheek (1) has a compressible section. The adjustment device comprises pressure means (3) allocated to the compressible section, which are designed in such a way that in a first state they exert a compression pressure on the compressible section, and that in a second state they do not exert any compression pressure on the compressible section. With a device of this kind, a simple height adjustment of the side cheek can be achieved, for example for the purpose of facilitating entry into a motor vehicle.

14 Claims, 1 Drawing Sheet

REGULATING DEVICE FOR A LATERAL PART OF A SEAT

CROSS-REFERENCE TO RELATED APPLICATIONS

This application claims priority to PCT/EP2005/002808 filed on Mar. 16, 2005; which claims priority to German Patent No. DE 10 2004 012829.4 filed Mar. 16, 2004.

The present invention relates to an adjustment device for adjusting the height of a side cheek of a seat, and in particular of a seat in a motor vehicle.

Figure 1:
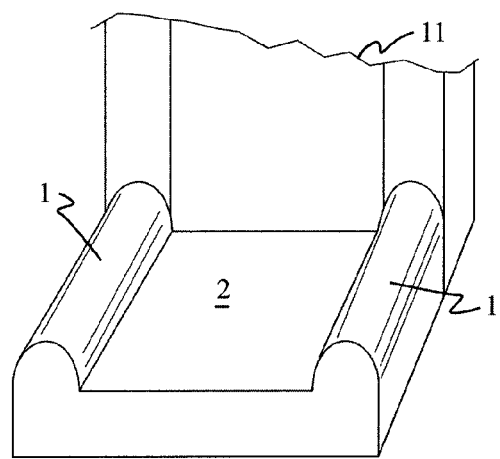

A seat with such side cheeks is represented in FIG. 1. In this situation, side cheeks 1 are arranged in the longitudinal direction on both sides of a seat surface 2. Similar side cheeks can also be arranged on a back 11 of the seat.

These side cheeks serve in particular to provide better lateral retention for a user of the seat, such as a driver in a motor vehicle, in particular when driving around a bend. In particular, seats referred to as sports seats are strongly characterized by such side cheeks.

In order to provide the user with sufficient retention, the side cheeks must have a certain height. In a motor vehicle this can lead to the side cheeks proving a hindrance when entering the vehicle and getting out of it.

In order to eliminate this problem, the principle is known, for example from WO 92/09451, of designing side cheeks to be capable of being slid and/or of being rotatable, so that they can be moved backwards and forwards between an operational position and a position for entering/alighting the vehicle, in which they are not in the way.

From EP 0 670 240 A1 the possibility is known of carrying out such an adjustment by means of a lever mechanism in the side cheek.

From DE 199 50 702 A1, for example, the principle is known of changing the volume of the side cheeks by means of inflatable bladders or balloons.

These solutions involve a relatively substantial technical effort, since either a relatively elaborate mechanical arrangement must be provided, or a device for inflating the corresponding bladder elements. This effort is particularly great if it is intended that the adjustment should be carried out automatically, such as coupled with the opening of a door.

It is therefore the object of the present invention to provide an adjustment device for a side cheek which is simple to realise and can be automatically controlled in a simple manner.

This object is achieved by an adjustment device in accordance with claim 1. The dependent claims define advantageous or preferred embodiments of the present invention.

In accordance with the invention, an adjustment device for adjusting the height of a side cheek of a seat is proposed, whereby the side cheek has a compressible section, in which pressure means are provided allocated to the compressible section, which are designed in such a way that in a first state they exert a compression pressure on the compressible section, and that in a second state they do not exert any compression pressure on the compressible section.

Due to the compression pressure, the compressible section is compressed, as a result of which the height of the side cheek is reduced, which in the case of a motor vehicle seat facilitates entering and alighting the vehicle. In addition to this, a control arrangement for the pressure means can be easily automated.

A side cheek of this kind can be manufactured from foam material, for example.

The pressure means can in particular be a flat element allocated to the compressible section, in order to exert a flat compression pressure on the compressible section. Pressure means of this kind can be arranged, for example, between a cover of the seat and the compressible section, but can also be formed by a corresponding cover of the seat.

In particular, a pull cable can be provided for tensioning the pressure means, in order to bring the pressure means into the second state. A pull cable of this kind can be, for example, a Bowden cable, which can be tensioned with a conventional actuator.

In this way, a simple height adjustment is possible with conventional means.

If the compressible section is elastic, or comprises elastic elements such as springs, it automatically reverts back into the non-compressed state if the pressure means are in the second state. Shaping means can also be provided for, however, which in the second state of the pressure means bring the compressible section into a non-compressed form. In this state, the compressible section does not necessarily have to be elastic.

Such shaping means can in particular consist of a plurality of sleeves or tubular sections arranged on a pull cable. When the pull cable is tensioned, the tubular sections are pressed together and so define a specific shape, such as an arc or a longitudinally extended shape. This pull cable can then be actuated in a complementary manner to the pull cable of the pressure means, for example by suspension in opposite directions in a cable drum of an actuator element. In this way, the adjustment of the height can be carried out in a simple manner of non-elastic or slightly elastic side cheeks.

Figure 2A:
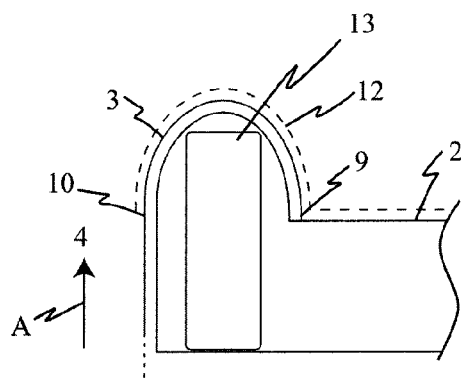
Figure 2B:
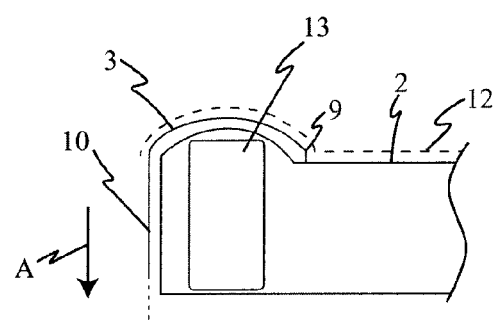
Figure 3A:
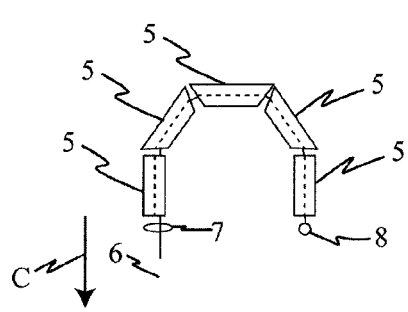
Figure 3B:
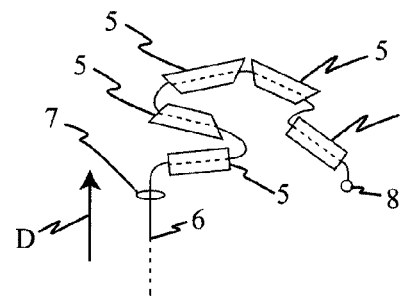

The invention is described hereinafter in greater detail on the basis of preferred embodiments, making reference to the appended drawings. These show:

FIG. 1A diagrammatic view of a seat with side cheeks,

FIGS. 2A and 2B Cross-sectional views of a side cheek from FIG. 1 with an adjustment device in accordance with the invention, whereby FIG. 2A shows a non-compressed state of the side cheek and FIG. 2B a compressed state, and FIGS. 3A and 3B are shaping means in accordance with the invention, whereby FIG. 3A corresponds to the state of FIG. 2A and FIG. 3B the state of FIG. 2B.

In FIG. 1 already described, a seat is shown, such as a seat in a motor vehicle, with two side cheeks 1 and a seat surface 2. Similar side cheeks can also be provided in the seat back 11, only represented in part. The adjustment device in accordance with the invention described hereinafter can likewise be used in this.

FIG. 2A shows a cross-sectional view of the left side cheek 1 from FIG. 1, with an adjustment device in accordance with the invention. Arranged above the side cheek is a pressure means 3, which is secured at an inner end to one or more points 9 or along a line 9 on the seat surface respectively, and is coupled at an outer end 10 to a pull cable adjustment mechanism 4. In principle, several parallel pull cables 4 can also be provided for. In addition, the outer end 10 can comprise a bracing element running into the plane of the drawing, in order to distribute the tension force of the pull cable 4 uniformly. The pressure means 3 can be, for example, a layer of fabric, although a braided fabric made of strips or similar designs are conceivable. Shown stretched over the pressure means 3 is a cover 12 of the seat. The pressure means 3 are therefore located between the actual seat cheek 1 and its cover. In principle, however, it is also possible for the cover 12 to be used as pressure means, provided that it consists of a suitably tensionally resistant material.

In the state shown in FIG. 2A, the pull cable 4 is relaxed (see arrow A in FIG. 2A), and the pressure means 3 are not exerting any pressure worth mentioning on the side cheek 1. The side cheek 1 is therefore in a state in which the side cheek 1 has a relatively considerable height.

If the pull cable 4 is now tensioned, as shown by an arrow B in FIG. 2B, the pressure means 3 is drawn downwards and exerts a compression pressure on the side cheek 1. This is therefore pressed downwards and flattened, so that the side cheek 1 has a relatively low height or no height at all. Accordingly, in the case of a motor vehicle seat it becomes easier to enter and alight the vehicle. A precondition for this is that the side cheek 1 consists of a compressible material, such as a foamed material, and does not contain any rigid parts, such as fixed arranged wire bars.

The tensioning of the pull cable 4, which can be designed in the form of a Bowden cable, can be effected with a conventional actuator, either manually or electrically. Such actuators are known in particular for the tensioning of Bowden cables for the bending of what are referred to as lumbar supports. In this situation, for tensioning the pull cable 4 is wound onto a drum, for example, or the pull cable 4 is tensioned with the aid of a threaded spindle.

If the pull cable 4 is then relaxed again, as indicated by the arrow A in FIG. 2A, the side cheek can then revert into its original shape again. If the side cheek 1 is made of an appropriate elastic material, this takes place automatically. Otherwise, shaping means are required, such as are described hereinafter by reference to FIGS. 3A and 3B.

FIG. 3A shows an embodiment in accordance with the invention of shaping means in a state corresponding to FIG. 2A, i.e. in a state in which the side cheek 1 adopts a high position. The shaping means comprise a plurality of tubular sections 5, through which a pull cable 6 runs. At one end of the pull cable 6 is a thickening 8, which is dimensioned in such a way that it cannot pass through the tubular sections 5. Provided at another end of the tubular sections 5 arranged in a row is a stop for the tubular sections 5, with a cable passage aperture 7, which is arranged securely in or on the seat, and which is dimensioned in such a way that the pull cable 6 can pass through it, but the tubular sections 5 cannot. If the pull cable 6 is now tensioned, as indicated by an arrow C, the tubular sections 5 are pressed together and form a predefined shape, which depends on the design of their individual ends in each case. In the embodiment shown the tubular sections form a curve shape.

If, by contrast, as indicated in FIG. 3B by an arrow D, the pull cable 6 is relaxed, the arrangement of the tubular sections 5 to one another no longer pertains, and they can be brought into almost any desired position. The tensioning and relaxing of the pull cable 6 can in this case take place as described above for the pull cable 4.

Shaping means of the type shown in FIGS. 3A and 3B can now be installed either in the seat cheek 1 or lie on it and be connected to it. If, as in the case of FIG. 2A, the pull cable 4 is relaxed and the pressure means 3 do not exert any compression pressure on the side cheek 1, the pull cable 6 is tensioned simultaneously, so that the tubular sections 5 adopt their predetermined shape, and therefore bring the side cheek 1 into the desired shape. If, by contrast, as in FIG. 2B, the pull cable 4 is tensioned and the side cheek 1 compressed, the pull cable 6 is simultaneously relaxed, so that the tubular sections 5 do not resist the compression process.

In this situation, several shaping means of this kind can be allocated to one side cheek, in order to define its shape over a greater section.

To do this, the pull cable 4 and the pull cable 6 can in particular be secured running in opposite directions on a drum, so that, as the drum rotates, one of the two pull cables 4 and 6 is always wound up onto the drum, and in each case the other of the pull cables 4 and 6 is unwound from the drum. This means that a rotation of the drum always leads to the tensioning of one of the pull cables and to the relaxing of the other.

Naturally, the shaping means can also be designed as a departure from FIGS. 3A and 3B. In particular, it is conceivable that the tubular sections 5 are designed in such a way that they form a straight line when the pull cable 6 is tensioned. This can be used, for example, to give the side cheek 1 a corresponding shape at its sides.

In principle, there are also other possibilities for shaping which are conceivable, such as springs 13, as illustrated in FIGS. 2A and 2B which are compressed by the pressure means 3 when the pull cable 4 is tensioned, and which relax again when the pull cable 4 relaxes, and in this situation give the side cheek 1 its desired shape. Elastic elements other than springs are also conceivable.

When a seat is installed in a motor vehicle, the tensioning and relaxing of the pull cable 4 can be linked to the opening or closing of a door, so that, when the door is opened the pull cable 4 is tensioned and the side cheek is therefore lowered in order to facilitate entering and alighting the vehicle. In this case it is sufficient for the device in accordance with the invention to be provided on the side cheek turned towards the door. It is also possible, however, for both side cheeks, as well as side cheeks in the back of the seat to be designed in an adjustable manner, so that a user of the seat can bring the side cheeks into a desired setting which appears to him to be the most comfortable.

It is also possible for only one section of the side cheeks 1 to be equipped with the device in accordance with the invention, such as a front section, in order to facilitate alighting or entering the vehicle at this section only.

The invention claimed is:

1. Adjustment device which adjusts the height of a side cheek of a seat,
    whereby the side cheek has a compressible section,
    the compressible section having pressure means which are secured at an inner end to at least one point on a surface of the seat and coupled at an outer end to at least one adjustment mechanism, so that in a first state the pressure means exerts a compression pressure on the compressible section, while in a second state the pressure means does not exert any compression pressure on the compressible section, so that the height of the side cheek in the first state of the pressure means is changed in comparison with the second state of the pressure means.

2. Adjustment device according to claim 1, wherein the pressure means comprises a flattening element, which is drawn downwards and flattens the side cheek of the compressible section by exerting a compression pressure on the side cheek.

3. Adjustment device according to claim 2, wherein the flattening element is selected from the group consisting of a fabric layer, a strip, and a net.

4. Adjustment device according to claim 1, wherein the pressure means are to be arranged between a covering of the seat and the compressible section.

5. Adjustment device according to claim 1, wherein the pressure means comprise a covering of the seat.

6. Adjustment device according to claim 1, wherein the adjustment device comprises a first pull cable coupled to the pressure means, whereby, when the first pull cable is tensioned, the pressure means assumes the first state, and when the first pull cable is relaxed it assumes the second state.

7. Adjustment device according to claim 6, wherein the first pull cable comprises a Bowden cable.

8. Adjustment device according to claim 1, wherein the adjustment device comprises shaping means which are to be coupled with the compressible section, which, in the second state of the pressure means can assume a predefined shape in order to bring the compressible section into a shape which corresponds to this predefined shape.

9. Adjustment device according to claim 8, wherein the shaping means comprise elastic means which are to be incorporated into the compressible section, whereby the elastic means are in a tensioned state in the first state, and in a relaxed state in the second state.

10. Adjustment device according to claim 9, wherein the elastic means comprise springs.

11. Adjustment device according to claim 8, wherein the shaping means comprise tubular sections arranged on a second pull cable, whereby the shaping means are designed in such a way that, when the second pull cable is tensioned, the tubular sections are pressed against one another and form the predefined shape, and, when the second pull cable is relaxed, the tubular sections can be brought into essentially any desired position.

12. Adjustment device according to claim 11, wherein the first pull cable and the second pull cable run in opposite directions to one another such that the tensioning of the first pull cable leads to a relaxing of the second pull cable.

13. Adjustment device according to claim 11, wherein the second pull cable comprises a Bowden cable.

14. Seat according to claim 1, wherein the compressible section of the side cheek is elastic.

* * * * *